May 22, 1928.
K. W. T. PRINTZ ET AL
1,670,938
GARMENT STRETCHER
Filed Aug. 27, 1925
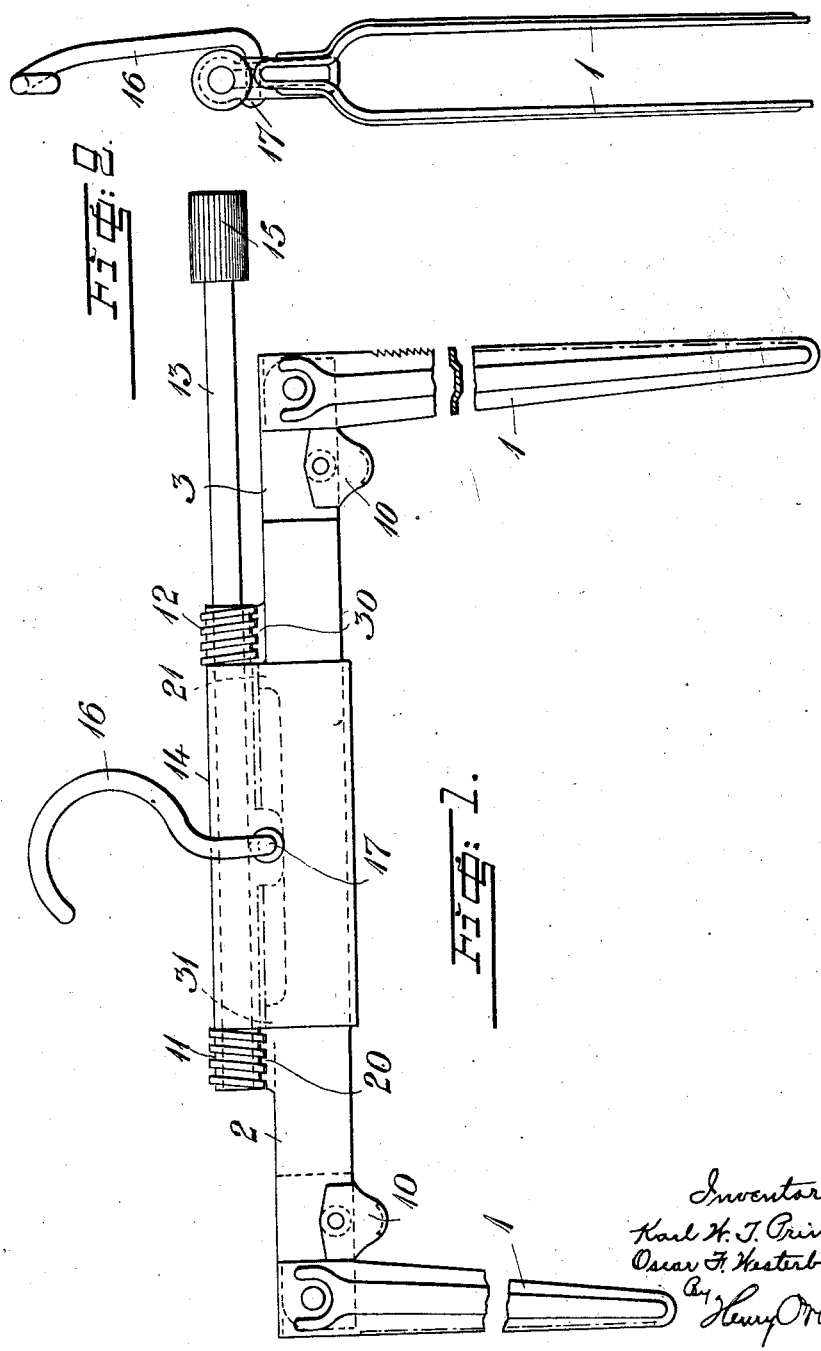

Patented May 22, 1928.

1,670,938

UNITED STATES PATENT OFFICE.

KARL WILHELM THEODOR PRINTZ AND OSCAR FREDRIK WESTERBERG, OF STOCKHOLM, SWEDEN.

GARMENT STRETCHER.

Application filed August 27, 1925, Serial No. 52,756, and in Sweden April 9, 1925.

The present invention relates to garment-stretchers, especially for trousers, of the kind, which comprises two bars connected to slide with relation to each other, the outer end of each bar being provided with prongs to engage the legs of the trousers, and in which the two prongs engaging each leg of the trousers may by relative displacement of said bars with relation to each other be separated to stretch the leg so that the trousers may be suspended thereby.

The invention has for its purpose to provide an improved trousers-hanger of the said kind in which means are provided to facilitate the operation of said bars.

To this end the said slidable bars comprise toothed racks guided by a common guiding sleeve carrying a rotatable shaft having a right-handed worm in mesh with the teeth of one rack and a left-handed worm in mesh with the teeth of the other rack, so that upon rotation of the said shaft by a suitable handle the bars will be moved relatively to each other to separate the prongs or move them towards each other according as the shaft is rotated in one direction or the other.

In the accompanying drawing a preferred embodiment of the invention is illustrated. Fig. 1 is a front elevation and Fig. 2 is a side elevation.

The hanger is composed of sliding bars 2, 3, engaging a common guiding sleeve 14. Pivoted to the outer end of each bar is a pair of prongs 1, 1. Adjacent its prongs each bar carries a locking member 10 to maintain the respective prongs in a position substantially at right angles to the bars, as shown. The locking members 10, 10 are designed to be maintained in proper position by friction but may be released by being turned manually to enable the prongs to be swung inwards. The bars 2, 3 are provided with teeth at their upper edges, as shown at 20 and 30, respectively, so as to form toothed racks. At a certain distance apart from its teeth each bar carries an upwardly extending projection or shoulder 21, 31, respectively. Meshing in the teeth 20 of bar 2 is a left-handed worm 11 made integral with or carried by a shaft 13 rotatably mounted in the guiding sleeve 14, and meshing in the teeth 30 of bar 3 is a right-handed worm 12 of said shaft 13.

It is to be noted that worm 11 may be right-handed and worm 12 left-handed, if desired.

The shaft 13 is formed with a suitable handle 15 to facilitate manual operation.

Pivoted to the sleeve 14 immediately above the upper edge of the bars 2 and 3 is the pin-like lower end 17 of a suspending hook 16. The said pin 17 of the hook 16 extends through the space between the teeth of each bar 2, 3, and the respective projections 21, 31.

When the hanger described above is to be used to suspend trousers the prongs 1, 1 are moved towards each other by turning the handle 15 in a given direction sufficiently to enable two legs at opposite ends to enter each leg of the trousers which are adapted to be suspended from the ends of the legs. The bars 2, 3 are then moved by turning the handle 15 in the opposite direction to separate the prongs sufficiently to stretch and hold the legs flat.

The bars 2, 3 should only be movable relatively to each other within given limits. The shutting up of the bars is limited by the fact that the said projections or shoulders 21, 31, will engage the inner end of the worms 11, 12. The separation of the bars is limited by the shoulders 21, 31 engaging the member 17.

The stretcher described above may be folded together. To fold the stretcher together the locking members 10, 10 are turned inwards thereby enabling the prongs 1, 1 to be swung towards each other. Furthermore, the hook 16 may be turned down towards the bars 2, 3, so that the stretcher may be caused to occupy a small space when not in use.

Having now described our invention, what we claim is:—

1. A trousers-hanger comprising two bars connected to slide relatively to each other, prongs on one end of each bar, a common guide for said bars, and a common screw mechanism carried by said guide to effect a positive displacement of said bars toward and from each other.

2. A trousers-hanger comprising two bars, a common guide for said bars adapted to enable the bars to slide relatively to each other and to said guide, a shaft rotatably mounted in said guide, a right-handed worm and a left-handed worm on said shaft, teeth on said bars engaged by said worms, prongs pivoted to one end of each bar, and means to secure the position of said prongs relatively to said bars.

3. A trousers-hanger comprising two bars, a common guide for said bars adapted to enable the bars to slide relatively to each other and to said guide, a shaft rotatably mounted in said guide, a right-handed worm and a left-handed worm on said shaft, teeth on said bars engaged by said worms, prongs pivoted to one end of each bar, means to secure the position of said prongs relatively to said bars, and a suspension-hook pivoted to the said common guide.

In testimony whereof we have signed our names.

KARL WILHELM THEODOR PRINTZ.
OSCAR FREDRIK WESTERBERG.